W. F. RICHARDS.
CAR COUPLING.
APPLICATION FILED JULY 28, 1915.

1,213,543.

Patented Jan. 23, 1917.
3 SHEETS—SHEET 1.

Inventor.
Willard F. Richards.
By Wilhelm & Parker.
Attorneys.

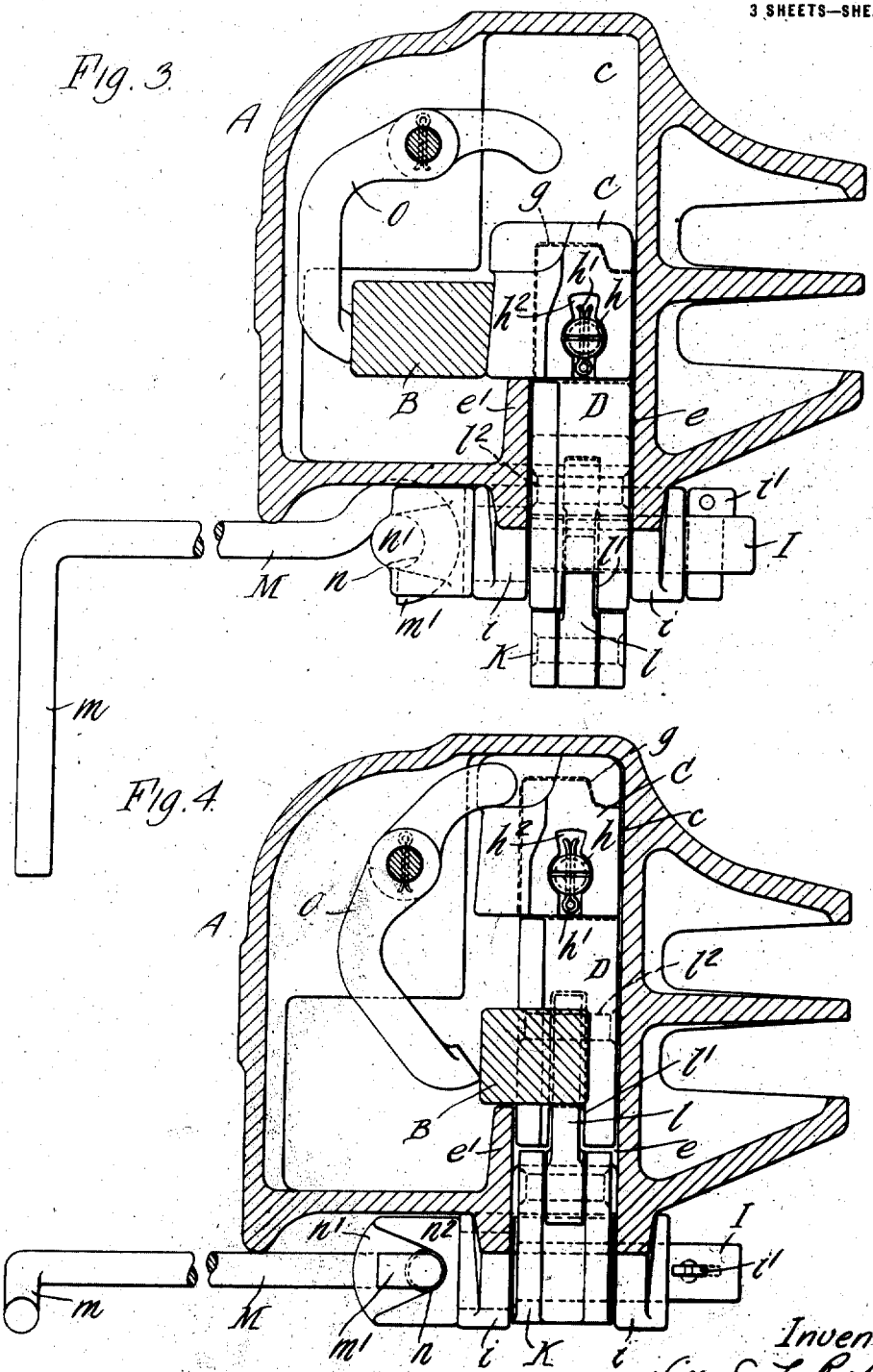

UNITED STATES PATENT OFFICE.

WILLARD F. RICHARDS, OF DEPEW, NEW YORK, ASSIGNOR TO GOULD COUPLER COMPANY, OF NEW YORK, N. Y.

CAR-COUPLING.

1,213,543.　　　　Specification of Letters Patent.　　Patented Jan. 23, 1917.

Application filed July 28, 1915.　Serial No. 42,302.

*To all whom it may concern:*

Be it known that I, WILLARD F. RICHARDS, a citizen of the United States, residing at Depew, in the county of Erie and State of New York, have invented a new and useful Improvement in Car-Couplings, of which the following is a specification.

This invention relates to improvements in railway car couplers of the Master Car Builders' type which are provided with a vertically sliding lock for the horizontally swinging knuckle, and more particularly to an improved bottom operating mechanism for the locks of such couplers. The improvements are especially desirable for passenger car couplers but the invention is not necessarily restricted to couplers for use on passenger couplers.

In passenger cars the coupler and its operating mechanism are ordinarily hidden from view beneath the platform, buffer or other overlying parts, and it is impossible or difficult to see the coupler so as to ascertain whether or not the knuckle is locked or unlocked. Some couplers are provided with an operating rod which extends to the side of the car and operates the lock by an endwise movement of the rod. But such operating means are not desirable for passenger car couplers since these couplers usually swing laterally through a considerable distance when the car is rounding curves and are liable to cause the accidental releasing of the lock by reason of the operating rod binding in its guides or supports on the car.

The objects of the invention are to provide an efficient bottom operating mechanism of simple and durable construction for car couplers of the type mentioned, in which the lock is operated by turning a rock shaft that extends crosswise of the car from the coupler and definitely indicates by its position whether the knuckle is locked or unlocked, but which cannot bind in its guides or supports so as to cause the operation of the lock when the coupler swings laterally in the passage of the car around curves; also to make the construction such that the lock can be operated with the minimum exertion and so that the weight of the handle of the operating shaft and the connections from the same to the lock all operate in conjunction with the weight of the lock to move the lock to its locking position and prevent it from being accidentally lifted by the jarring or vibration of the coupler; also to connect the rocking operating rod to the operating mechanism in a simple and efficient manner.

Figure 1:
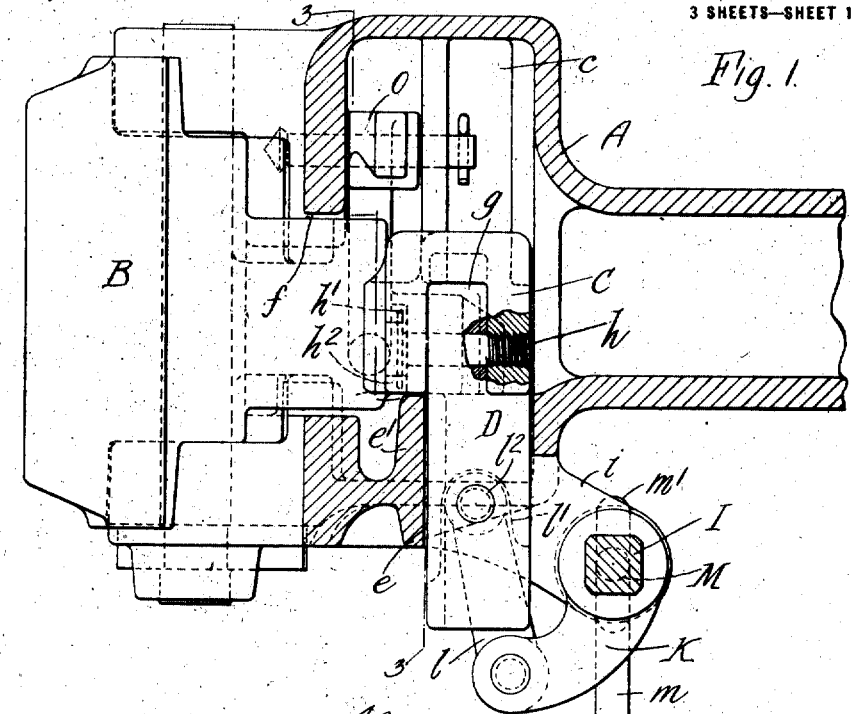
Figure 2:
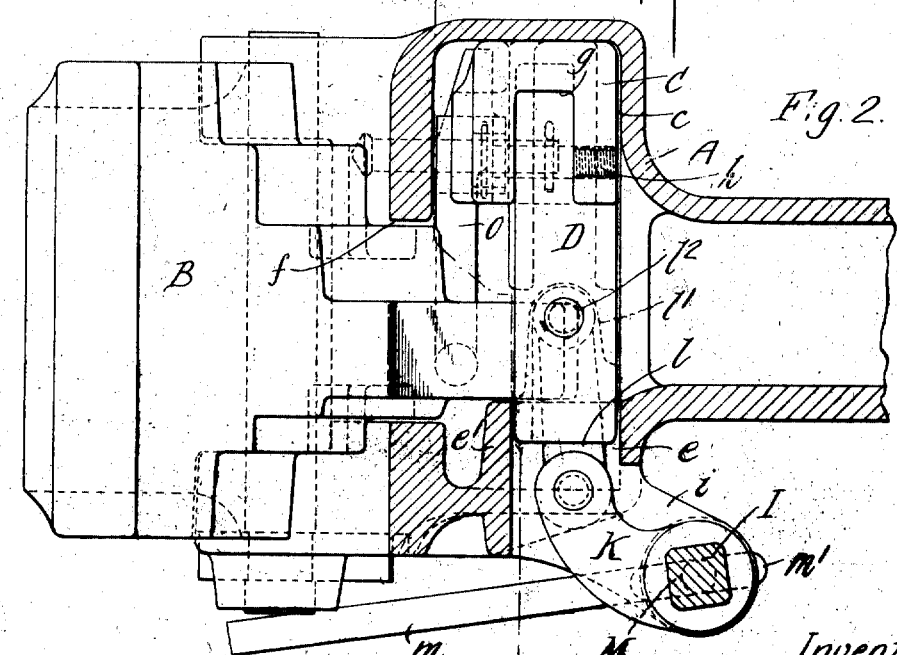
Figure 5:
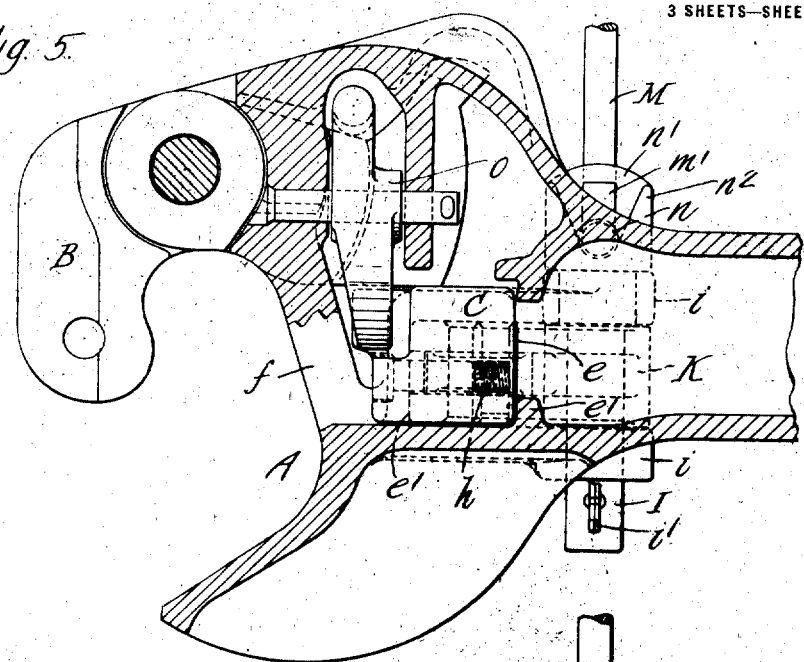
Figure 6:
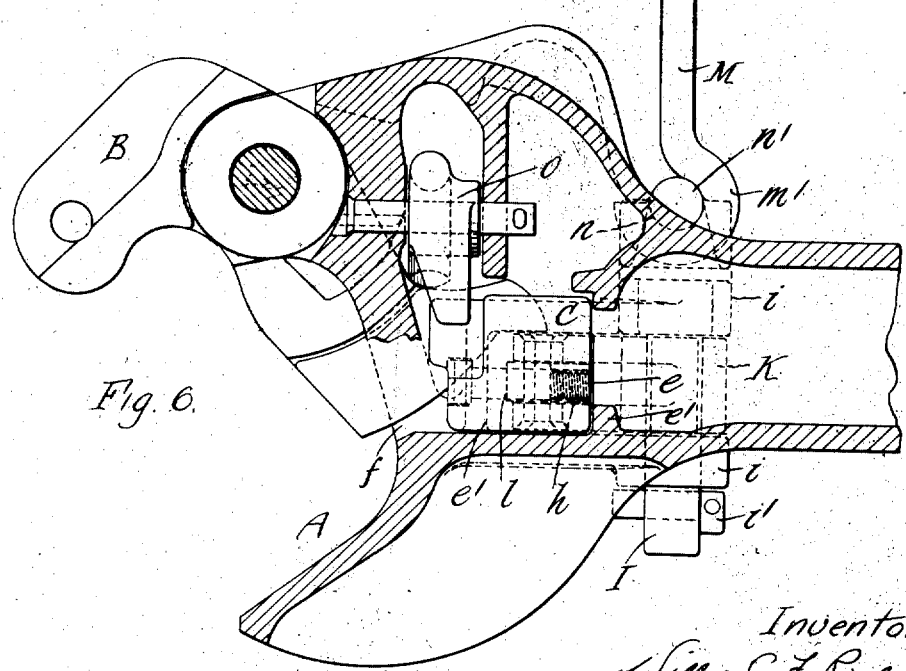

In the accompanying drawings, Figure 1 is a longitudinal sectional elevation of a car coupler embodying the invention, showing the lock in its lower or locked position. Fig. 2 is a similar view showing the lock raised or released. Fig. 3 is a transverse sectional elevation thereof in line 3—3, Fig. 1. Fig. 4 is a similar view in line 4—4, Fig. 2. Figs. 5 and 6 are sectional plan views of the coupler respectively showing the locked and unlocked positions of the parts.

A represents the drawhead or coupler head, B the horizontally pivoted knuckle, and C the knuckle lock of a car coupler. The coupler head and knuckle may be of any suitable construction. The lock consists of a heavy block, preferably of substantially rectangular cross section and of relatively large dimensions, which is arranged to move vertically in a suitable recess $c$ in the coupler head beneath the top thereof for locking and unlocking the knuckle, and having a guide stem or shank D, also preferably of rectangular shape in cross section, which depends from the locking block and is adapted to slide vertically in a guide hole $e$ in the bottom of the coupler for guiding the lock in its vertical movements. This guide stem is made of much smaller cross sectional area than the lock in order that the guide hole $e$ for the same in the bottom of the coupler can be made small enough not to weaken the coupler head. The walls $e'$ of the guide hole $e$ are made of sufficient vertical extent to afford a proper guide for the lock. The coupler head is preferably closed or solid above the lock, as this is desirable both for the sake of strength and to prevent the entrance of snow, ice and dirt into the coupler.

In order to enable the lock to be placed in position in the coupler head without providing a hole in the top of the head or making the hole in the bottom large enough for the passage of the lock, the guide stem is made separate from the locking block and is detachably secured thereto. In assembling the parts of the coupler the locking block is inserted into the head through the usual knuckle-tail opening $f$ provided in the front wall of the head and the guide stem D is then passed upwardly through the guide hole $e$ in the bottom of the coupler head and secured to the locking block. The drawings show a desirable connection for the locking block and stem in which the upper end of the stem, which is reduced, is seated in a socket $g$ in the locking block and is secured therein by a screw $h$ which passes through registering holes in the front portion of the locking block and the end of the stem and is screwed into a threaded hole in the rear portion of the locking block. The screw is provided at its front end with a screw driver slot for turning it, and is prevented from unscrewing by a cotter pin $h'$ which is passed through the hole in the front end of the screw and is seated in a recess $h^2$ provided for it in the front face of the locking block. This construction permits the securing screw for the stem and block to be readily inserted and locked against accidental unscrewing, the locking cotter pin for the screw being located in an accessible position at the front side of the locking block.

I represents a rock shaft which extends transversely beneath the coupler head and is journaled to rock or turn in suitable bearing lugs $i$ which are preferably formed integrally on the bottom of the coupler head and depend therefrom at opposite sides of the guide hole $e$. The lugs are, in effect, continuations of the side walls $e'$ of the guide hole and form extended side guides for the lock stem. The rock shaft can be retained in the bearings by suitable means, such as a key $i'$ passing through a slot in one end of the shaft outside of the adjacent bearing lug. Secured to the rock shaft to turn therewith between the bearing lugs is a rock arm K which extends forwardly from the rock shaft and is pivoted at its front end to the lower end of a link $l$ which is suitably pivoted at its upper end in a slotted recess $l'$ in the lower end of the lock stem by a rivet or other suitable pivotal connection $l^2$. The rock arm K is adapted to swing from a lower position, indicated in Fig. 1, to an upper position, indicated in Fig. 2, in which its front end extends up into the guide hole $e$ in the bottom of the coupler head. The lock is raised and lowered for unlocking and locking the knuckle by rocking the rock shaft in its bearings. As the front end of the rock arm swings in a nearly vertical arc and the link connection with the guide stem is substantially upright, there is very little tendency to press the guide stem laterally against the walls of the guide hole in the bottom of the coupler, so that the mechanism operates very easily and freely and has much less tendency to cause the lock to bind in its guide than in constructions in which the rock arm has a sliding engagement with the guide stem.

M represents an operating rod or shaft for turning the rock shaft I. This rod is secured to one end of the rock shaft I and extends to the side of the car where it is provided with an operating crank handle $m$, the rod being journaled so as to turn or rock in suitable bearings or supports (not shown) on the car. The operating rod is preferably connected to the rock shaft I by a hook $m'$ at the inner end of the rod, which passes through an eye $n$ on the end of the rock shaft I. This eye is preferably integral with the rock shaft and is provided with a cross piece $n'$ of round cross-section which the hoop embraces, and with side walls $n^2$ which are located at opposite sides of the hook and are wider than the cross piece $n'$ of the eye so as to provide an extended bearing for the sides of the hook and thus strengthen the connection and give a more extended bearing surface for the hook against the eye for turning the rock shaft. The side walls $n^2$ of the eye diverge outwardly as shown in Fig. 4, thus permitting the rock shaft I to swing on the hook in the fore and aft movements of the coupler, in addition to the vertical pivotal movement of the hook in the eye.

As the lock is raised and lowered by rocking the transversely extending rock shaft I in its bearings, the lock is not affected by any pull or thrust on the operating rod which might result from the rod binding in its bearings when the coupler swings laterally, due to the car rounding a curve, and since the arm K of the rock shaft is attached to the lock by a link connected to the rock arm and to the stem of the lock, the lock is positively moved by the rocking of the operating shaft both to raise and lower the lock. The position of the crank handle $m$ of the operating rod thus positively indicates whether the lock is raised or lowered, which is not the case in constructions in which the rock shaft simply engages the stem of the lock and is not positively connected thereto. When the lock is raised or in its unlocked position, the rock arm and the operating crank handle both extend forwardly or toward the lock from the rock shaft and thus the weight of the crank handle, the rock arm and the link all tend to move the lock downwardly and hold it in its locked position. The weight of these parts thus acts in conjunction with the weight of the lock for holding the lock down in its locking position and preventing it from jumping upwardly and releasing the knuckle by reason of the jarring or vibrations of the coupler.

O represents a knuckle-opening lever or kicker pivoted in the head with one arm adapted to engage the tail of the knuckle and the other arm adapted to be struck by the lock when raised for throwing the knuckle open.

I claim as my invention:

1. In a car coupler, the combination with a coupler head and a pivoted knuckle, of a knuckle locking block arranged to move vertically in a cavity in the coupler head, a guide stem rigid with said locking block which is detachably connected to and depends from said block through a guide hole in the bottom of the coupler head in which the stem is adapted to slide vertically for guiding the locking block in its vertical movements, said stem and guide hole being of less cross sectional area than said locking block, a rock shaft extending beneath the coupler head crosswise thereof, bearings at the bottom of said coupler head in which said rock shaft is journaled, an arm which extends lengthwise of the coupler from said rock shaft below the lower end of said guide stem, and a substantially upright link which is pivoted at its lower end to the free end of said rock arm and is pivoted at its upper end to said guide stem above the lower end thereof, both said guide stem and said link being arranged to move through said guide hole in the operation of the lock.

2. In a car coupler, the combination with a coupler head and a pivoted knuckle, of a knuckle-locking block arranged to move vertically in a cavity in the coupler head, a guide stem which is rigid with said locking block and depends therefrom through a guide hole in the bottom of the coupler head in which the stem is adapted to slide vertically for guiding the locking block in its vertical movements, said stem and guide hole being of less cross-sectional area than said locking block, and the lower portion of said guide stem being recessed for the reception of a link, a rock shaft extending beneath the coupler head crosswise thereof, bearings at the bottom of said coupler head in which the rock shaft is journaled, an arm which extends lengthwise of the coupler from said rock shaft below the lower end of said guide stem, and a substantially upright link which is pivoted to the free end of said arm and extends into the recess of said guide stem and is pivoted to said stem above the lower end thereof, both said guide stem and said link being arranged to move through said guide hole in the operation of the lock.

3. In a car coupler, the combination with a coupler head and a pivoted knuckle, of a knuckle locking block arranged to move vertically in a cavity in the coupler head, a guide stem rigid with said block which depends from the block through a guide hole in the bottom of the coupler head in which the stem is adapted to slide vertically for guiding the locking block in its vertical movements, said stem and guide hole being of less cross-sectional area than said locking block, a rock shaft journaled on the coupler head beneath the bottom thereof and extending crosswise of the coupler, an arm fixed to and extending from said rock shaft lengthwise of the coupler toward said guide stem, a link pivotally connected to said arm and to said guide stem whereby said locking block is moved positively both up and down by the rocking of said shaft, said rock shaft being weighted so that said arm tends to swing downwardly to lower and hold the locking block in locking position.

4. In a car coupler, the combination with the coupler head and a pivoted knuckle, of a knuckle locking block arranged to slide vertically in the coupler head, a guide stem which depends from said block through a hole in the bottom of the coupler in which the stem is adapted to slide vertically for guiding the locking block in its vertical movements, said stem and guide hole being of polygonal cross-section and of less cross-sectional area than said locking block, bearing lugs integral with said coupler head which project from the bottom thereof at opposite sides of said guide hole and are separated by a space which opens into and connects with said guide hole at the rear side thereof, a rock shaft journaled in said lugs and extending crosswise beneath the coupler head, a rock arm secured to said shaft and extending forwardly in the space between said bearing lugs with its front end adapted to swing in a substantially upright arc and to enter said guide hole in the upper position of said arm, and a substantially upright link which is pivoted to said rock arm and to said guide stem.

5. In a car coupler, the combination with the coupler head and a pivoted knuckle, of a vertically movable knuckle locking block provided with a reduced depending guide stem which depends through and is adapted to slide vertically in a guide hole in the bottom of the coupler head, a rock shaft extending crosswise beneath said coupler head and journaled thereon, a rock arm secured to said rock shaft and connected with said guide stem, said rock shaft being provided at one end with an eye, and an operating rod provided with a hook entering said eye for connecting said rod to said shaft for turning the latter, said eye being provided at opposite sides of said hook with side walls which extend beyond the cross piece of the eye and are adapted to engage the sides of the hook.

Witness my hand, this 26 day of July, 1915.

WILLARD F. RICHARDS.

Witnesses:
ALLEN B. BRIMMER,
RALPH C. SMITH.